United States Patent
Yamamoto et al.

[11] Patent Number: 5,371,729
[45] Date of Patent: Dec. 6, 1994

[54] INFORMATION RECORDING METHOD

[75] Inventors: Ryoichi Yamamoto; Shizuo Umemura; Kazuo Sanada, all of kanagawa, Japan

[73] Assignee: Fuji Photo Film Co., Ltd., Kanagawa, Japan

[21] Appl. No.: 103,239

[22] Filed: Aug. 9, 1993

[30] Foreign Application Priority Data

Aug. 19, 1992 [JP] Japan .................... 4-220108

[51] Int. Cl.⁵ .............................. G11B 9/00
[52] U.S. Cl. ........................ 369/126; 250/492.2
[58] Field of Search .............. 369/126; 365/97, 101, 365/103, 65; 250/306, 307, 492.2

[56] References Cited
U.S. PATENT DOCUMENTS 4,139,908 2/1979 Brody .................. 369/126

FOREIGN PATENT DOCUMENTS 57-27447 2/1982 Japan .

*Primary Examiner*—Paul M. Dzierzynski
*Assistant Examiner*—Kiet T. Nguyen
*Attorney, Agent, or Firm*—Sughrue, Mion, Zinn, Macpeak & Seas

[57] ABSTRACT

In an information recording method, a voltage is applied to an information recording medium comprising a semiconductor layer and a layer of a ferroelectric substance overlaid on the semiconductor layer, and information is thereby recorded on the information recording medium by means of directions of polarization of the ferroelectric substance. The value of the applied voltage is set at a value such that a voltage not lower than avalanche breakdown voltage may be applied to depletion layers, which occur in the semiconductor layer. Information is thus recorded quickly.

4 Claims, 3 Drawing Sheets

F I G. 1
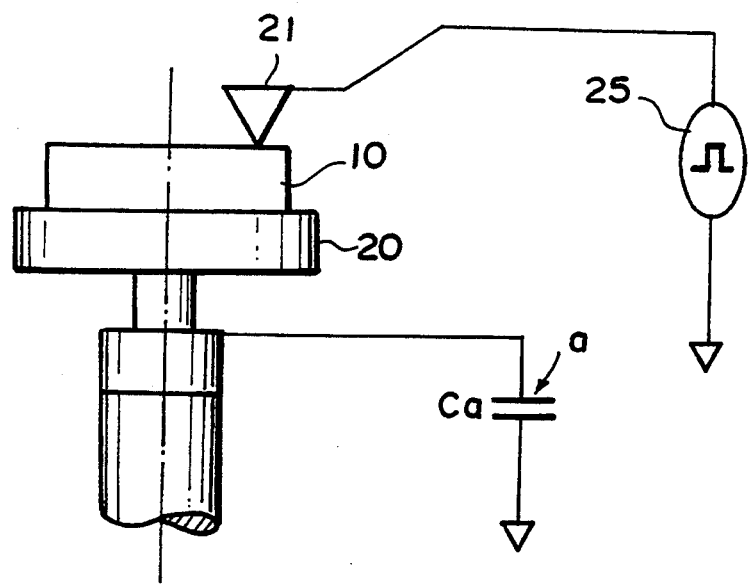
F I G. 2
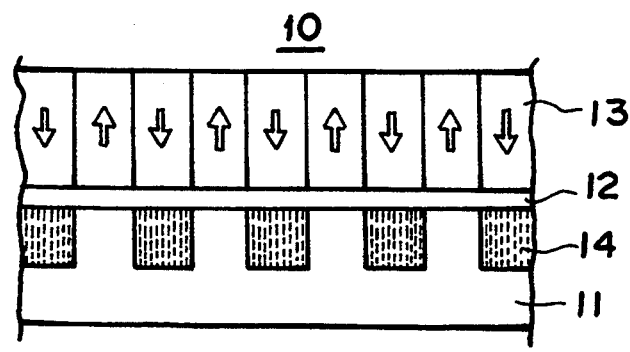

INFORMATION RECORDING METHOD

BACKGROUND OF THE INVENTION

1. Field of the Invention

This invention relates to an information recording method. This invention particularly relates to a method for recording information on an information recording medium, which is provided with a semiconductor layer and a layer of a ferroelectric substance, by means of directions of polarization of the ferroelectric substance.

2. Description of the Prior Art

Information recording media, on which various kinds of information, such as image signals and audio signals, can be recorded at a high density or which can be used as high-density signal memories for computers, have been proposed in, for example, Japanese Unexamined Patent Publication No. 57(1982)-27447. The proposed information recording medium comprises a semiconductor layer and a layer of a ferroelectric substance overlaid on the semiconductor layer and records the information by means of directions of polarization of the ferroelectric substance. Recording of the information on the proposed information recording medium is carried out by moving an electroconductive head (an electrode) on the ferroelectric substance layer, and at the same time applying a voltage to the ferroelectric substance layer such that only predetermined portions of the ferroelectric substance layer may be selectively polarized in a predetermined direction. When the information is to be reproduced from the information recording medium, a change in the electrostatic capacitance of the recording medium due to depletion layers, which are formed in the semiconductor layer by the polarization of the ferroelectric substance, is detected by an electroconductive head.

When information is recorded on the aforesaid information recording medium, the recording speed is determined by the speed, with which the polarization of the ferroelectric substance is reversed. It has heretofore been considered that the speed, with which the polarization of the ferroelectric substance is reversed, will take a value intrinsic to each kind of the ferroelectric substance. This consideration is correct in one aspect. However, research carried out by the inventors revealed that the speed, with which the polarization of the ferroelectric substance is reversed, often varies for the same kind of the ferroelectric substance. If the speed, with which the polarization of the ferroelectric substance is reversed, becomes low, the recording speed will inevitably become low, and the time required for the information to be recorded will become long.

SUMMARY OF THE INVENTION

The primary object of the present invention is to provide an information recording method, wherein the speed, with which the polarization of a ferroelectric substance is reversed, is increased to extremes in any case and for every kind of ferroelectric substance, and quick recording of information is thereby enabled.

The present invention provides an information recording method, in which a voltage is applied to an information recording medium comprising a semiconductor layer and a layer of a ferroelectric substance overlaid on the semiconductor layer, and information is thereby recorded on the information recording medium by means of directions of polarization of the ferroelectric substance, wherein the improvement comprises setting the value of the applied voltage at a value such that a voltage not lower than avalanche breakdown voltage may be applied to depletion layers, which occur in the semiconductor layer.

The term "avalanche breakdown voltage" as used herein means the lowest level of voltage among the voltage levels that cause avalanche breakdown to occur.

Examples of the ferroelectric substances used in the information recording method in accordance with the present invention include ferroelectric substances having a perovskite structure, barium titanate, lead titanate-lead zirconate solid solutions, bismuth titanate, strontium niobate-barium niobate having a tungsten-bronze structure, glycine sulfate, potassium nitrate, potassium phosphate, $C(NH_2)_3Al(SO_4)_2 6H_2O$, sodium nitrite, and SbSI. Examples of organic ferroelectric substances used in the information recording method in accordance with the present invention include vinylidene fluoride (VDF) polymers, copolymers containing vinylidene fluoride, odd Nylons, vinylidene cyanide polymers, copolymers containing vinylidene cyanide, vinyl fluoride (VF) polymers, and copolymers containing vinyl fluoride.

As the semiconductor layer, a substrate constituted of a semiconductor may be used directly. Alternatively, a plastic material, glass, or a metal, which has been provided with guide grooves, guide pits, pits representing sector information, or the like, may be used as a substrate, and a semiconductor layer may be overlaid on the substrate. As the semiconductor, it is possible to use Si, Ge, a III–V Group compound semiconductor, such as GaAs, or a II–VI Group compound semiconductor, or an organic semiconductor, such as polypyrrole or polythiophene. These semiconductors may be single crystalline, polycrystalline, or amorphous. Also, the resistivity of the semiconductor should preferably fall within the range of approximately 0.01 $\Omega$cm to 1,000 $\Omega$cm, and should more preferably fall within the range of approximately 0.1 $\Omega$cm to 100 $\Omega$cm.

The semiconductor should preferably be constituted of impurity-doped, N-type or P-type silicon. The impurity concentration in silicon should fall within the range of approximately $10^{19}$ to $10^{24} m^{-3}$, and should preferably fall within the range of approximately $10^{20}$ to $10^{23} m^{-3}$.

As described above, the speed, with which the polarization of the ferroelectric substance is reversed, varies even for the same type of the ferroelectric substance. Specifically, research carried out by the inventors revealed that, when a "+" voltage and a "−" voltage are alternately applied to an information recording medium and information is thereby recorded on the information recording medium, the speed, with which the polarization of the ferroelectric substance is reversed, becomes low on a specific side. For example, in cases where a P-type semiconductor is employed as the semiconductor layer, the speed, with which the polarization of the ferroelectric substance is reversed, becomes low on the side of application of the "+" voltage. In cases where an N-type semiconductor is employed as the semiconductor layer, the speed, with which the polarization of the ferroelectric substance is reversed, becomes low on the side of application of the "−" voltage. In such cases, when it is considered that the direction of voltage application coincides with the direction of formation of a depletion layer in the semiconductor layer, it is presumed that the speed, with which the polarization of the ferroelectric substance is reversed, decreases because the speed, with which the polarization of the ferroelectric substance is reversed, is determined by the number of minority carriers, which occur and which are to accumulate at the interface of the semiconductor layer, the interface being located on the side of the ferroelectric substance layer.

However, it was confirmed that, when the value of the applied voltage is set as defined in the information recording method in accordance with the present invention, the speed, with which the polarization of the ferroelectric substance is reversed, becomes high even in cases where the reversal of the polarization has heretofore become slow. It is considered that such effects are obtained because avalanche breakdown occurs in the depletion layers in the semiconductor layer and therefore the minority carriers accumulate at the interface of the semiconductor layer, which interface is located on the side of the ferroelectric substance layer, at a speed such that the minority carriers may not determine the speed, with which the polarization of the ferroelectric substance is reversed.

As described above, with the information recording method in accordance with the present invention, the value of voltage, which is applied to the information recording medium comprising the semiconductor layer and the ferroelectric substance layer, is set at a value such that a voltage not lower than avalanche breakdown voltage may be applied to depletion layers, which occur in the semiconductor layer. In this manner, the speed, with which the polarization of the ferroelectric substance is reversed, can be kept sufficiently high, and quick recording of information can be carried out.

BRIEF DESCRIPTION OF THE DRAWINGS

FIG. 1 is a schematic side view showing an example of an apparatus for carrying out the information recording method in accordance with the present invention, FIG. 2 is a schematic sectional side view showing an information recording medium, on which information is recorded with the apparatus of FIG. 1.

DESCRIPTION OF THE PREFERRED EMBODIMENTS

Figure 3:
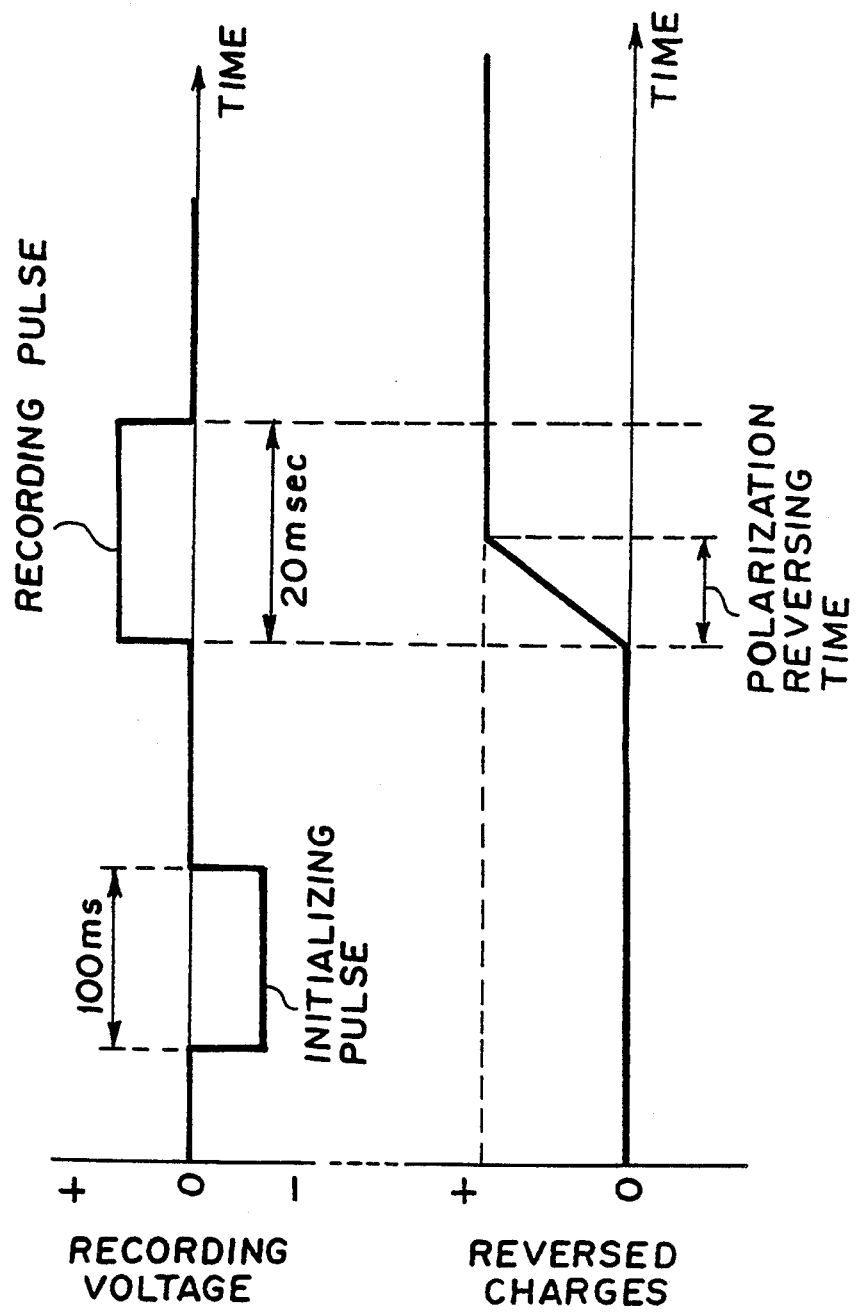
FIG. 3 is a graph showing the wave form of a recording voltage and a change in reversed electric charges in the apparatus of FIG. 1.

The present invention will hereinbelow be described in further detail with reference to the accompanying drawings.

<First embodiment>

FIG. 1 shows an example of an apparatus for carrying out the information recording method in accordance with the present invention. FIG. 2 is an explanatory sectional side view showing an information recording medium 10, on which information is recorded with the information recording method in accordance with the present invention. The information recording medium 10 will first be described hereinbelow.

The information recording medium 10 comprises a semiconductor layer 11, an insulating layer 12 overlaid on the semiconductor layer 11, and an organic ferroelectric substance layer 13 overlaid on the insulating layer 12. In this embodiment, a semiconductor substrate is directly used as the semiconductor layer 11. As the substrate, a P-type silicon wafer having a resistivity of 5 $\Omega$cm and an impurity concentration of $5 \times 10^{21} m^{-3}$. The insulating layer 12 is constituted of a layer of silicon oxide (SiO$_2$), which has a thickness of 50 nm and is overlaid on the silicon wafer with a thermal oxidation process. The organic ferroelectric substance layer 13 overlaid on the insulating layer 12 is constituted of a copolymer of vinylidene fluoride (VDF) with trifluoroethylene (TrFE) (proportion of vinylidene fluoride: 65 mol %), which copolymer serves as an organic ferroelectric substance.

By way of example, the organic ferroelectric substance layer 13 is formed in the manner described below. First, the aforesaid copolymer (hereinafter referred to as the VDF/TrFE copolymer) is dissolved in a proportion of 10 wt % in methyl ethyl ketone (MEK). The resulting solution is then applied onto the silicon wafer by using a commercially available spin coater under the swing conditions of a rotational speed of 5,000 rpm and 10 seconds. Thereafter, the coating layer is annealed in an ambient atmosphere in an oven under the conditions of 145° C. ×2 hours. In this manner, a layer of the VDF/TrFE copolymer having a layer thickness of 1 μm is formed.

The insulating layer 12 need not necessarily be provided between the semiconductor layer 11 and the organic ferroelectric substance layer 13. However, the insulating layer 12 should preferably be provided because the problems with regard to carrier injection into the ferroelectric substance can be avoided. In cases where silicon is used as the semiconductor as in this embodiment, the insulating layer 12 should preferably be constituted of SiO$_2$, and its thickness should preferably be not larger than 100 nm.

Information is recorded on the information recording medium 10 by using the apparatus shown in FIG. 1. In such cases, as illustrated in FIG. 1, the information recording medium 10 is secured to a turn table 20 by an air chuck, or the like, and the turn table 20 serves as one of electrodes for application of a voltage during the recording step. Also, as the other electrode for the application of the voltage, a movable needle-like electrode 21 is used. In this embodiment, as the needle-like electrode 21, a gold-plated tungsten needle having a bottom surface diameter of 50 μm is employed.

While the turn table 20 is kept stationary, the needle-like electrode 21 is brought into contact with the organic ferroelectric substance layer 13 of the information recording medium 10. In this state, the voltage is applied from a pulsed electric power source 25 to the organic ferroelectric substance layer 13 across the needle-like electrode 21 and the turn table 20. As a result, the portion of the organic ferroelectric substance facing the needle-like electrode 21 is polarized in a predetermined direction. In this manner, the information can be recorded with the direction of the polarization.

As illustrated in FIG. 2, when electric polarization is caused to occur in the organic ferroelectric substance layer 13 in the manner described above, depletion layers 14, 14, . . . occur at portions of the semiconductor layer 11 corresponding to the portions of the organic ferroelectric substance layer 13, at which the direction of polarization is downward towards the semiconductor layer 11. Therefore, the recorded information can be read out by detecting a change in the electrostatic capacitance due to each depletion layer 14 by use of a known pickup circuit.

In experiments carried out for evaluating reversal of polarization, each of +100V, +120V, +140V, 160V, and +180V was applied as a signal voltage with a pulse width of 20 msec to the needle-like electrode 21, and the polarization reversing time, i.e. the recording time, was measured. Electric charges accumulating at a capacitor Ca shown in FIG. 1 were measured, and the time required before the electric charges reached saturation was taken as the recording time. FIG. 3 shows the wave form of the pulsed voltage and how the electric charges accumulating at the capacitor Ca change. The original recording voltage having a pulse width of 100 msec shown in FIG. 3 was used to initialize such that the directions of polarization of the insulating layer 12 might be trued up.

As described above, in the experiments, only the "+" levels of voltage were applied. This was because the semiconductor layer employed in this embodiment was of the P type, and therefore the direction of occurrence of the depletion layers 14, 14, . . . in the semiconductor layer 11 coincided with the "+" potential side.

Figure 4:
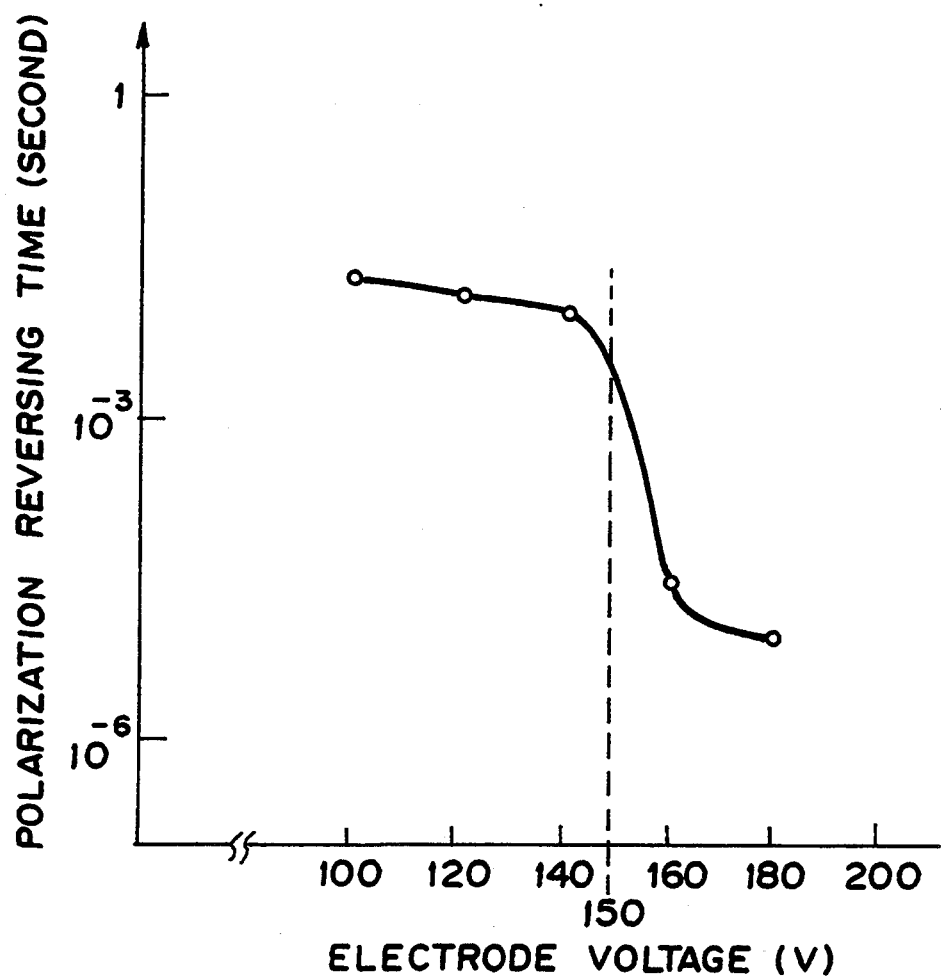
FIG. 4 is a graph showing the relationship between an applied voltage (an electrode voltage) and the polarization reversing time.

Table 1 shows the results of the investigation of the recording time in the aforesaid experiments. FIG. 4 is a graph showing these results.

TABLE 1

| Applied voltage | 100 V | 120 V | 140 V | 160 V | 180 V |
|---|---|---|---|---|---|
| Polarization reversing time | 20 msec | 12 msec | 10 msec | 30 $\mu$sec | 10 $\mu$sec |

As is clear from Table 1 and FIG. 4, when the applied voltage (the electrode voltage) is higher than 140V, the speed, with which the polarization of the ferroelectric substance is reversed, becomes markedly high. When the depth of a depletion layer 14 occurring in the semiconductor layer 11 is calculated from the impurity concentration in the semiconductor, and the voltage divided to the depletion layer 14 is then calculated from the depth of the depletion layer 14, the voltage divided to the depletion layer 14 can be found as being approximately 100V when the electrode voltage is 150V. Also, from the impurity concentration in the semiconductor, the avalanche breakdown voltage of the depletion layer 14 can be calculated as being approximately 100V. Therefore, it is considered that, if the electrode voltage is higher than 150V, the voltage applied to the depletion layer 14 becomes higher than the avalanche breakdown voltage.

From the results described above, in cases where information is recorded on the information recording medium 10 by using the apparatus shown in FIG. 1 and with the information recording method in accordance with the present invention, the applied voltage (the electrode voltage) should be set at a value not lower than 150V.

The speed of reversal of the polarization, which is inherent to the VDF/TrFE copolymer employed in this embodiment, is approximately 10 $\mu$sec. Therefore, it is considered that, at the time at which the applied voltage is raised to 180V, the recording speed increases to the extreme value determined by the characteristics of this ferroelectric substance. Some ferroelectric substances have their inherent speeds of reversal of the polarization, which are quicker than 10 $\mu$sec. When such ferroelectric substances are used, a higher recording speed can be obtained.

The avalanche breakdown voltage depends on characteristics of a semiconductor. Therefore, the avalanche breakdown voltage can be kept lower than 150V by appropriately selecting the semiconductor. As a result, the applied voltage (the electrode voltage) can be kept low. Also, when the organic ferroelectric substance layer 13 is made thin, the voltage required for the polarization of the ferroelectric substance to be reversed and the applied voltage (the electrode voltage) can be kept low. Therefore, in the information recording method of the present invention, the applied voltage (the electrode voltage) is not limited to the value described above.

<Second embodiment>

The same information recording medium 10 and the same recording apparatus as those in the first embodiment were used, and experiments were carried out to find whether the reversal of the polarization could be effected normally when recording was carried out with a short recording pulse width. The reversal of the polarization was evaluated by measuring the electrostatic capacitance of the information recording medium 10 in the same manner as in actual signal reproduction. A commercially available LCR meter was used to measure the electrostatic capacitance.

First, the initialization for truing up the polarization was carried out with a minus pulse (−200V). Thereafter, the initial value of the electrostatic capacitance of the information recording medium 10 was measured. Information was then recorded with a +180V pulsed voltage having a pulse width of 20 $\mu$sec. After the recording step, the electrostatic capacitance was measured in the same manner. Also, as a comparative example, the recording step was carried out in the same manner as that described above, except that the recording voltage was set at +140V. Table 2 shows the thus obtained results.

TABLE 2

| | Applied voltage | Electrostatic capacitance | |
|---|---|---|---|
| | | Initial | After recording |
| Second embodiment | 180 V | 0.15 pF | 0.12 pF |
| Comparative example | 140 V | 0.15 pF | 0.15 pF |

As shown in Table 2, in the comparative example in which the applied voltage (the electrode voltage) is 140V and it is considered that no avalanche breakdown occurs, even if the recording operation is carried out with the recording voltage application time of as short as 20 $\mu$sec, the electrostatic capacitance does not change from the initial value of 0.15 pF. Thus it can be found that no information can be recorded.

On the other hand, in the second embodiment wherein the applied voltage (the electrode voltage) is 180V and it is considered that avalanche breakdown occurs, when the recording operation is carried out, the electrostatic capacitance drops from the initial value of 0.15 pF to 0.12 pF. Thus it was confirmed that information could be recorded normally.

What is claimed is:

1. An information recording method, in which a voltage is applied to an information recording medium comprising a semiconductor layer and a layer of a ferroelectric substance overlaid on the semiconductor layer, and information is thereby recorded on the information recording medium by means of directions of polarization of the ferroelectric substance, wherein the improvement comprises the step of setting the value of the applied voltage at a value such that a voltage not lower than avalanche breakdown voltage is applied to depletion layers, which occur in the semiconductor layer.

2. A method as defined in claim 1 further comprising an insulating layer intervenes between the semiconductor layer and the ferroelectric substance layer.

3. A method as defined in claim 2 wherein the insulating layer is constituted of SiO2.

4. A method as defined in claim 1 wherein the semiconductor layer is constituted of impurity-doped, N-type or P-type silicon.

* * * * *